INVENTORS
CORNELIS JACOBUS ESVELDT
EVERT WILLEM GORTER

United States Patent Office 2,916,456
Patented Dec. 8, 1959

2,916,456

MAGNET CORES HAVING A SUBSTANTIALLY RECTANGULAR HYSTERESIS LOOP

Cornelis Jacobus Esveldt and Evert Willem Gorter, Emmasingel, Eindhoven, Netherlands, assignors, by mesne assignments, to North American Philips Company, Inc., New York, N.Y., a corporation of Delaware Application January 10, 1955, Serial No. 480,909

Claims priority, application Netherlands January 28, 1954

4 Claims. (Cl. 252—62.5)

Magnet cores having a substantially rectangular outline of the hysteresis loop are of importance for several uses. This kind of cores is used inter alia for so-called "magnetic memories" (see, for example, W.N. Papian, "Proceedings of the I.R.E." April 1952, pages 475–478, and D. R. Brown and E. Albers-Schoenberg, "Electronics," April 1953, pages 146 to 149). Such magnetic memories are used inter alia in calculating machines and for automatic pilots. Said cores are also used in magnetic switches.

Figure 1:
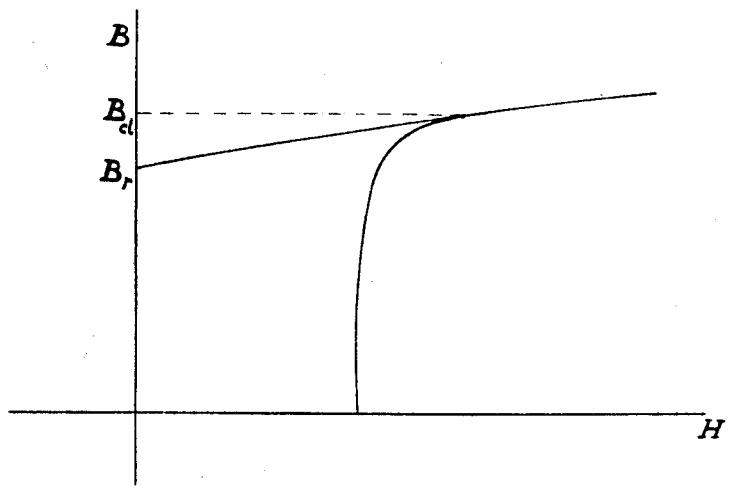
Figure 2:
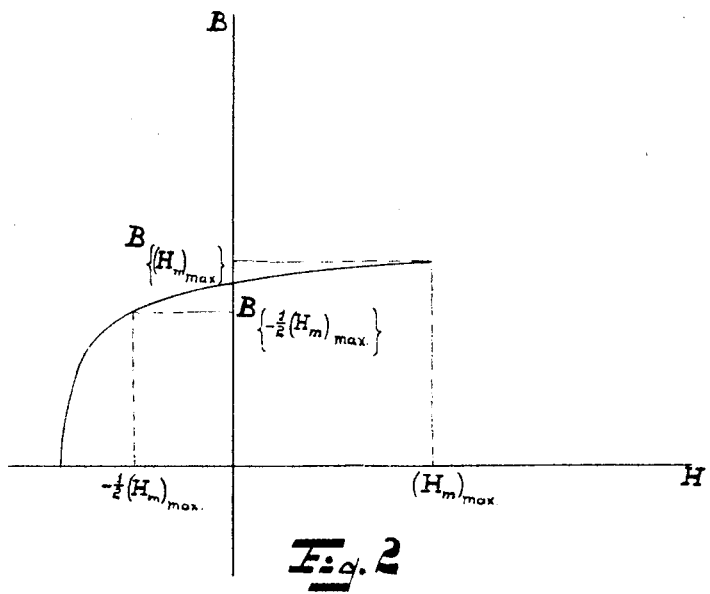

The invention will be described in connection with the accompanying drawing in which Figs. 1 and 2 are portions of a hysteresis loop of a material according to the invention.

The extent, to which the outline of the hysteresis loop approaches a rectangle may be expressed quantitatively in different ways. A usual measure is, for example, the quotient $$\frac{B_r}{B_{c1}}$$

For an explanation of the significance of the said quotient reference is made to Fig. 1 of the drawing, showing diagrammatically a portion of a saturation-magnetisation curve. In the figure, $B_r$ indicates the residual inductance and $B_{c1}$ indicates that inductance, at which the hysteresis loop exactly closes itself. In practice it is often no easy task to measure $B_{c1}$ with high accuracy. However, a value for $B_{c1}$ which is approximately exact is readily found on the basis of the mean value of the inductances after partial magnetisation and partial demagnetisation (with interim saturation) both inductances measured at the same field strength which is such that the inductances relatively differ by more than 1%, but less than 3%. This procedure was followed in the measurements having led to the present invention. For these measurements use was made of a ballistic galvanometer (see Bozorth, "Ferromagnetism," page 843). Whenever reference is made to the quotient $$\frac{B_r}{B_{c1}}$$

this is assumed to be measured on an annular magnet core of constant cross-section of the ferromagnetic material throughout the circumference of the ring and having an outer diameter at the most 1.6 times the inner diameter.

The extent, to which the outline of the hysteresis loop approaches a rectangle, may also be expressed by means of the so-called "squareness ratio" $(R_s)_{max}$. For the significance of the said magnitude reference is made to the literature mentioned in the preamble. For the sake of completeness a short explanation now follows with reference to Fig. 2, also showing diagrammatically a portion of a magnetisation curve, relating to a case in which the demagnetisation was started before the magnetic saturation was reached. The magnitude $(R_s)_{max}$ is defined as:

$$\left[ \frac{B_{(-\frac{1}{2}H_m)}}{B_{(H_m)}} \right]_{max}$$

The quotient $$\frac{B_{(-\frac{1}{2}H_m)}}{B_{(H_m)}}$$

is a function of the maximum field strength $H_m$ applied. This quotient is found to be maximum for a determined value of $H_m$ which in most cases slightly differs from the coercivity $H_c$. The maximum value of the quotient is indicated by the symbol $(R_s)_{max}$. As before, the measurements of $B_{(H_m)}$ and $B_{(-\frac{1}{2}H_m)}$ required for determining $(R_s)_{max}$ may be carried out with the use of a ballistic galvanometer. The measuring objects, as before, are constituted by annular magnet cores of constant cross-section of the magnetic material throughout the circumference of the ring and having an outer diameter at the most 1.6 times the inner diameter.

When using ferromagnetic materials having a substantially rectangular outline of the hysteresis loop, in most cases alternating currents of high frequency are concerned, so that it is necessary for eddy-currents to be limited as far as possible. When use is made of ferromagnetic alloys, this may be effected to a certain extent by building up the magnet core from relatively insulated layers of ferromagnetic material which are very thin. However, it is often extremely difficult with such thin layers to build up cores having a substantially rectangular outline of the hysteresis loop. At this high frequency it is thus advantageous and at even higher frequencies even necessary to utilise magnetically-soft ferri-oxide containing materials with spinel structure, since such substances in themselves have a very low electric conductivity.

For the serviceability of the relative magnet core for magnetic memories and magnetic switches it is also an essential condition that the coercivity $H_c$ shall be low (not higher than 10 Oersted and preferably even lower than 5 Oersted) since otherwise unduly strong magnet fields are required to vary the polarity of the magnetisation of the core.

According to the invention, it has been found that magnet cores having a substantially rectangular outline of the hysteresis loop such as to fulfill the conditions $$\frac{B_r}{B_{c1}} \geq 0.7$$

and $(R_s)_{max} > 0.6$, while $H_c < 4$ Oersted may be manufactured from a material consisting at least substantially of at least one compound of the formula:

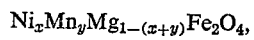

in which $x = 0.1 - 0.8$
$y = 0.1 - 0.8$ and
$x + y \leq 0.9$ which compounds are manufactured by heating a mixture consisting of nickel compound, manganese compound, magnesium compound and iron compound to the desired ratio of weight in air or nitrogen up to a temperature of from 1400° to 1475° C. preferably of about 1450° C.

As an alternative, the heating process may be effected, at the same temperatures, in oxygen, but in this case the limits between which $x$ and $y$ in the above-mentioned formula can vary are somewhat different. It is then necessary to fulfill the conditions:

$x = 0.1 - 0.4$
$y = 0.2 - 0.6$ and
$x + y \leq 0.9$

EXAMPLE

A mixture consisting of nickel carbonate, $NiCO_3$, manganese carbonate, $MaCO_3$, magnesium carbonate, $MgCO_3$ and ferrioxide, $Fe_2O_3$, is ground in absolute alcohol for 5 hours. The resultant powder is preheated in air at 900° C., for one hour. After cooling, the reaction product is ground in absolute alcohol for another two hours, the resultant product subsequently being pressed to form a ring. The ring is heated at about 1450° C. in nitrogen, air or oxygen for two hours.

Cores of different compositions are manufactured by varying the ratio of the amounts of nickel carbonate, manganese carbonate, and magnesium carbonate in the initial material. The composition, the value of the quotient $$\frac{B_r}{B_{c1}}$$

and the values of $(R_s)_{max}$ and of $H_c$ are specified for some cores in the table below.

(a) *Heated in technical nitrogen*

| Composition | | $\frac{B_r}{B_{c1}}$ | $(R_s)_{max}$ | $H_c$ |
|---|---|---|---|---|
| $x$ | $y$ | | | |
| 0.5 | 0.1 | 0.95 | 0.8 | 1.4 |
| 0.2 | 0.5 | 0.95 | 0.75 | 1.0 |
| 0.3 | 0.4 | 0.9–0.95 | 0.75 | 0.9 |
| 0.2 | 0.7 | 0.9 | 0.7 | 0.9 |

(b) *Heated in air*

| Composition | | $\frac{B_r}{B_{c1}}$ | $(R_s)_{max}$ | $H_c$ |
|---|---|---|---|---|
| $x$ | $y$ | | | |
| 0.7 | 0.1 | 0.75 | 0.7 | 2.2 |
| 0.1 | 0.3 | 0.85 | 0.8 | 2.0 |
| 0.4 | 0.2 | 0.85 | 0.75 | 2.0 |
| 0.1 | 0.7 | 0.75 | 0.4 | 1.2 |

(c) *Heated in oxygen*

| Composition | | $\frac{B_r}{B_{c1}}$ | $(R_s)_{max}$ | $H_c$ |
|---|---|---|---|---|
| $x$ | $y$ | | | |
| 0.2 | 0.6 | 0.75 | 0.65–0.7 | 1.4 |
| 0.3 | 0.5 | 0.75 | 0.65 | 1.5 |
| 0.2 | 0.4 | 0.7 | 0.7 | 1.5 |
| 0.2 | 0.3 | 0.8 | 0.75 | 1.5 |

What is claimed is:
1. A ferromagnetic ferrite having a substantially square hysteresis loop formed by firing in a non-reducing atmosphere at a temperature of about 1400° to 1475° C. a mixture of nickel oxide, manganese oxide, magnesium oxide, and ferric oxide in proportions present in a composition having the formula:

$$Ni_xMn_yMg_{1-(x+y)}Fe_2O_4$$

in which:

$x$ is between 0.1 and 0.8
$y$ is between 0.1 and 0.8
$x+y$ is not greater than 0.9, said ferrite having a coercive force of less than 4 Oersted, a value of $B_r/B_{c1}$ of at least 0.7 and a value of $(R_s)_{max}$ of at least 0.6.

2. A ferromagnetic ferrite having a substantially square hysteresis loop formed by firing in oxygen at a temperature of about 1400° to 1475° C. a mixture of nickel oxide, manganese oxide, magnesium oxide, and ferric oxide in proportions present in a composition having the formula:

$$Ni_xMn_yMg_{1-(x+y)}Fe_2O_4$$

in which $x$ is between 0.1 and 0.4
$y$ is between 0.2 and 0.6
$x+y$ is not greater than 0.9, said ferrite having a coercive force of not more than 4 Oersted, a value of $B_r/B_{c1}$ of at least 0.7 and a value of $(R_s)_{max}$ of at least 0.6.

3. A ferromagnetic ferrite as claimed in claim 1 obtained by firing in an atmosphere of air.

4. A ferromagnetic ferrite as claimed in claim 1 obtained by firing in an atmosphere of nitrogen.

References Cited in the file of this patent

FOREIGN PATENTS

| 671,788 | Great Britain | May 7, 1952 |
| 697,219 | Great Britain | Sept. 16, 1953 |
| 735,375 | Great Britain | Aug. 17, 1955 |